United States Patent
Li

(10) Patent No.: US 11,627,208 B2
(45) Date of Patent: Apr. 11, 2023

(54) METHOD FOR MANAGEMENT OF INTELLIGENT INTERNET OF THINGS, SYSTEM AND SERVER

(71) Applicants: HEFEI BOE DISPLAY TECHNOLOGY CO., LTD., Anhui (CN); BOE TECHNOLOGY GROUP CO., LTD., Beijing (CN)

(72) Inventor: Hongli Li, Beijing (CN)

(73) Assignees: HEFEI BOE DISPLAY TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 758 days.

(21) Appl. No.: 16/330,700

(22) PCT Filed: Jul. 3, 2018

(86) PCT No.: PCT/CN2018/094204
§ 371 (c)(1),
(2) Date: Mar. 5, 2019

(87) PCT Pub. No.: WO2019/052266
PCT Pub. Date: Mar. 21, 2019

(65) Prior Publication Data
US 2021/0385304 A1    Dec. 9, 2021

(30) Foreign Application Priority Data
Sep. 13, 2017  (CN) .......................... 201710823389.3

(51) Int. Cl.
*H04L 69/08* (2022.01)
*G16Y 40/10* (2020.01)
(Continued)

(52) U.S. Cl.
CPC .......... *H04L 69/08* (2013.01); *G05B 19/4185* (2013.01); *G16Y 10/75* (2020.01);
(Continued)

(58) Field of Classification Search
CPC ........ G16Y 40/10; G16Y 40/35; G16Y 10/75; H04L 69/08; H04Q 9/00
See application file for complete search history.

(56) References Cited

U.S. PATENT DOCUMENTS 10,178,206 B2 * 1/2019 Tessiore .................. H04L 69/16
10,484,476 B2   11/2019 Rosea et al.
(Continued)

FOREIGN PATENT DOCUMENTS

CN      102025577 A      4/2011
CN      102970778 A      3/2013
(Continued)

OTHER PUBLICATIONS

The Second Chinese Office Action dated Apr. 2, 2020; appln No. 201710823389.3.
International Search Report and Written Opinion dated Sep. 27, 2018; PCT/CN2018/094204.
The Extended European Search Report dated Jul. 5, 2021; Appln. No. 18849420.7.

*Primary Examiner* — Jason D Recek

(57) ABSTRACT

There is provided in the present disclosure a method for management of an Internet of things, including: receiving first sensing data from a first sensing device, and converting the first sensing data that confirms to a first type of data transmission protocol into first sensing data that confirms to a third type of data transmission protocol; receiving second sensing data from a second sensing device, and converting the second sensing data that conforms to a second type of data transmission protocol into second sensing data that conforms to a third type of data transmission protocol, wherein the second type of data transmission protocol is different from the first type of data transmission protocol;
(Continued)

and generating display data of the predetermined environment model including an updated first sub-model and/or an updated second sub-model, based on the first sensing data, the second sensing data and the predetermined environment model.

14 Claims, 10 Drawing Sheets

(51) Int. Cl.
*G16Y 40/35* (2020.01)
*G16Y 10/75* (2020.01)
*G05B 19/418* (2006.01)
*H04Q 9/00* (2006.01)

(52) U.S. Cl.
CPC .............. *G16Y 40/10* (2020.01); *G16Y 40/35* (2020.01); *H04Q 9/00* (2013.01); *G05B 2219/31124* (2013.01)

(56) References Cited

U.S. PATENT DOCUMENTS

| | | | | |
|---|---|---|---|---|
| 2012/0310602 A1* | 12/2012 | Jacobi | ..................... | G06F 30/13 703/1 |
| 2015/0355311 A1* | 12/2015 | O'Hagan | .............. | H04W 4/023 340/539.13 |
| 2015/0381947 A1 | 12/2015 | Renkis | | |
| 2016/0274553 A1 | 9/2016 | Strohmenger et al. | | |
| 2018/0367617 A1* | 12/2018 | Moustafa | .............. | H04L 67/125 |

FOREIGN PATENT DOCUMENTS

| | | |
|---|---|---|
| CN | 105988367 A | 10/2016 |
| CN | 106506213 A | 3/2017 |
| KR | 1020160118813 A | 10/2016 |
| WO | 02/082302 A1 | 10/2002 |
| WO | 2016/137427 A1 | 9/2016 |

\* cited by examiner

400

- 410: receiving, from one or more first sensing device, first sensing data that conforms to a first type of data transmission protocol, and converting the first sensing data that conforms to the first type of data transmission protocol into first sensing data that conforms to a third type of data transmission protocol, wherein the first sensing data is associated with a first sub-model in a predetermined environment model

- 420: receiving, from one or more second sensing devices, second sensing data that conforms to a second type of data transmission protocol, and converting the second sensing data that conforms to the second type of data transmission protocol into second sensing data that conforms to a third type of data transmission protocol, wherein the second sensing data is associated with a second sub-model in the predetermined environment model, and wherein the second type of data transmission protocol and the first type of data transmission protocol are different

- 430: generating display data of a predetermined environment mode including an updated first sub-module and/or an updated second sub-module, based on the first sensing data that conforms to the third type of data transmission protocol, the second sensing data that conforms to the third type of data transmission protocol and the predetermined environment model

- 440: transmitting the display data to a corresponding user terminal in response to a request from the user

Fig. 4

METHOD FOR MANAGEMENT OF INTELLIGENT INTERNET OF THINGS, SYSTEM AND SERVER

CROSS-REFERENCE TO RELATED APPLICATION

The present application claims the priority of a Chinese patent application No. 201710823389.3 filed on Sep. 13, 2017. Herein, the content disclosed by the Chinese patent application is incorporated in full by reference as a part of the present application.

TECHNICAL FIELD

The present disclosure relates to a system for management of Internet of things, in particular to a method, server and system for generating display data based on data from different sensing devices and a predetermine environment model.

BACKGROUND

As construction scale of industry factories is increasing constantly, the number of devices is growing. There are diversified types of supervisory and regulatory systems, for example, systems such as location-based service (LBS), video monitoring (CCTV), FAB monitoring clients (FMC), power equipment of a factory district and environment monitoring, etc. Administrators' requirements for managing the factory district are also increasing. Traditional supervisory and regulatory systems have disadvantages of simple page, unitary content, complicated hierarchy and relatively separated from each other, and thus they cannot satisfy the administrator's requirement for performing "centralized monitoring and unified management" on the factory district.

SUMMARY

According to one aspect of the present disclosure, there is provided a method for management of an Internet of things, comprising: receiving, from one or more first sensing devices, first sensing data that conforms to a first type of data transmission protocol, and converting the first sensing data that conforms to said first type of data transmission protocol into first sensing data that conforms to a third type of data transmission protocol, wherein said first sensing data is associated with a first sub-model in a predetermined environment model; receiving, from one or more second sensing devices, second sensing data that conforms to a second type of data transmission protocol, and converting the second sensing data that conforms to said second type of data transmission protocol into second sensing data that conforms to the third type of data transmission protocol, wherein said second sensing data is associated with a second sub-model in said predetermined environment model, wherein said second type of data transmission protocol is different from said first type of data transmission protocol; generating display data of said predetermined environment model including an updated first sub-model and/or an updated second sub-model, based on the first sensing data that conforms to said third type of data transmission protocol, the second sensing data that conforms to said third type of data transmission protocol and said predetermined environment model, wherein said first sub-model is updated by said first sensing data, and said second sub-model is updated by said second sensing data.

In some embodiments, said method further comprises: transmitting said display data in response to a request from a user.

In some embodiments, said first sensing device is an electronic positioning tag, wherein said electronic positioning tag is associated with a coordinate system in said predetermined environment model, and said generating display data for updating said first sub-model in said predetermined environment model comprises: generating, according to coordinate data received from said electronic positioning tag, display data for displaying a marker indicating said electronic positioning tag on a corresponding coordinate in said predetermined environment model.

In some embodiments, said second sensing device is a state sensor for monitoring an environment state, wherein said state sensor is associated with a device model disposed in said predetermined environment model, and said generating display data for updating said second sub-model in said predetermined environment model comprises: generating, according to environment state data received from said state sensor, display data for displaying said environment state data as state date of the associated device model in said predetermined environment model.

In some embodiments, said state sensor comprises a temperature sensor, a humidity sensor, a camera, a device state sensor.

In some embodiments, said method further comprises: allocating the first sensing data and the second sensing data to a distributed sub-processor in a symmetric way.

In some embodiments, said method further comprises: transmitting the first sensing data and the second sensing data to a distributed processor by way of broadcast; and monitoring the first sensing data and the second sensing data.

In some embodiments, in said predetermined environment model, an angle of view is switched circularly based on a predetermined sequence in order to generate display data for updating state data of each of a plurality of device models.

In some embodiments, said method further comprises: obtaining a first determination result according to the first sensing data or the second sensing data; and sending an alarm signal based on the first determination result.

In one embodiment, generating display data for updating said first sub-model and said second sub-model in said predetermined environment model comprises: switching the angle of view to display a parameter state of a device model associated with the first sensing device when an alarm signal is sent based on the first sensing data; switching the angle of view to display a parameter state of a device model associated with the second sending device when an alarm signal is sent based on the second sensing data.

According to another aspect of the present disclosure, there is provided a server for a system of an Internet of things, comprising: an adapter, including at least a first sub-adapter and a second sub-adapter, wherein the first sub-adapter is configured to receive, from one or more first sensing devices. first sensing data that conforms to a first type of data transmission protocol, and convert the sensing data that conforms to the first type of data transmission protocol into first sensing data that conforms to a third type of data transmission protocol, wherein said first sensing data is associated with a first sub-model in a predetermined environment model; said second adapter is configured to receive, from one or more second sensing devices, second sensing data that conforms to a second type of data transmission protocol, and convert the second sensing data that conforms to the second type of data transmission protocol into second sensing data that conforms to a third type of data transmission protocol, wherein said second sensing data is associated with a second sub-model in said predetermined environment model, wherein said first type of data transmission protocol is different from said second type of data transmission protocol; a processor, configured to generate display data for updating states of said first sub-model and said second sub-model in said predetermined environment model, based on the first sensing data that conforms to the third type of data transmission protocol, the second sensing data that conforms to the third type of data transmission protocol and said predetermined environment model.

According to another aspect of the present disclosure, there is provided a system of an Internet of things, comprising: a sensing device, including at least a first sensing device and a second sensing device, wherein said first sensing device is configured to collect first sensing data that conforms to a first type of data transmission protocol, and said second sensing device is configured to collect second sensing data that conforms to a second type of data transmission protocol; a server, configured to execute steps of said method as described above; a display terminal, configured to receive display data from said server, and display an update environment model according to the received display data.

In some embodiments, displaying an updated environment according to the received display data comprises displaying the updated environment model in a virtual display mode.

BRIEF DESCRIPTION OF THE DRAWINGS

In order to describe technical solutions of embodiments of the present disclosure more clearly, accompanying figures that need to be used in description of the embodiments will be introduced briefly. Obviously, the accompanying figures described below are just some embodiments of the present disclosure. For those ordinary skilled in the art, other figures can be obtained according to these figures without paying any inventive labor. The following figures are not purposely scaled and drawn according to the actual dimensions, because the key point is to show the substance and spirit of the present disclosure.

FIG. 4 shows a method for a management system of an intelligent Internet of things of the present disclosure;

DETAILED DESCRIPTION

Figure 1:
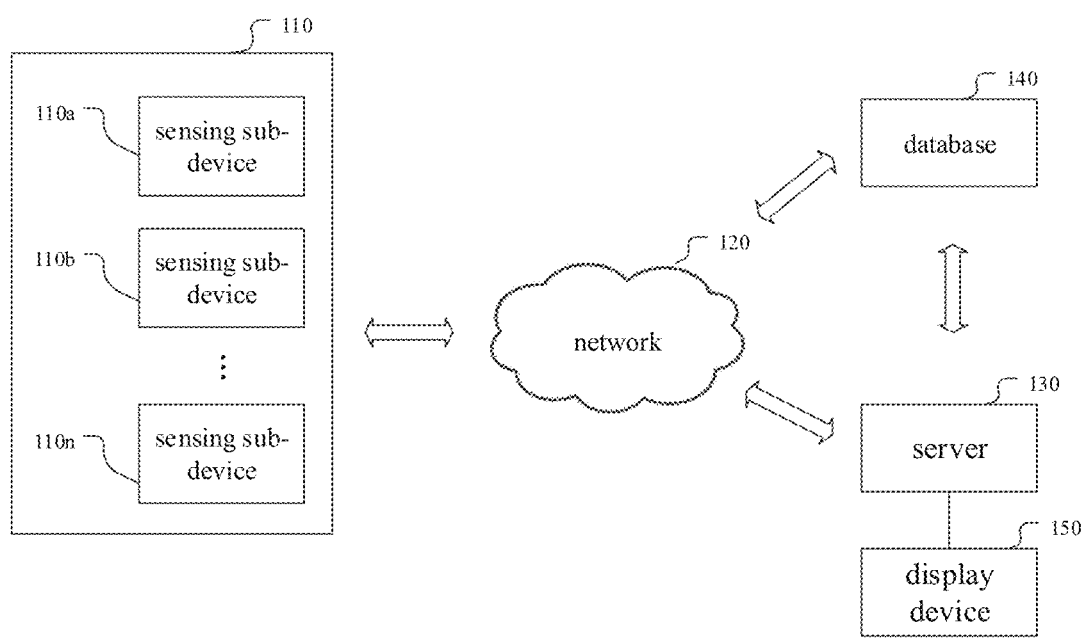
FIG. 1 is a schematic diagram of a management system of an intelligent Internet of things according to some embodiments of the present disclosure.

Technical solutions in embodiments of the present disclosure will be described below clearly and completely by combining with accompanying figures. Obviously, the embodiments described below are just a part of embodiments of the present disclosure, but not all the embodiments. Based on the embodiments of the present disclosure, all the other embodiments obtained by those ordinary skilled in the art without paying any inventive labor also fall into the scope sought for protection in the present disclosure.

"First", "second" and similar words used in the present disclosure do not indicate any sequence, quantity or importance, but they are just used to distinguish different components. Also, "include", "comprise" and similar words mean that an element or an object appearing prior to the word covers an element or an object or its equivalent listed subsequent to the word, but does not exclude other elements or objects. "Connect", "connected to" and other similar words are not limited to physical or mechanical connection, but can comprise electrical connection, regardless of direct connection or indirect connection. "Up", "down", "left", "right" and so on are used to only indicate a relative position relationship. After an absolute position of a described object is changed, the relative position relationship is likely to be changed correspondingly.

As shown in the present application and the Claims, unless exceptions clearly indicated in the context, "a/an", "one", "one kind" and/or "the" and so on does not particularly refer to a singular form, but can also include a plural form. Generally, terms of "include" and "comprise" only indicate to include steps and elements having been clearly defined, while these steps and elements do not form an exclusive list, and the method or the device is likely to include other steps or elements.

Although the present application makes various references of some modules in the system according to the embodiments of the present application, any amount of different modules can be used and applied at a user terminal and/or a server. The modules are just for description, and different aspects of the system and method can use different modules.

The present application uses a flow chart to show operations performed by the system according to the embodiments of the present application. It shall be understood that previous or subsequent operations are not necessarily executed in sequence accurately. On the contrary, various steps can be processed in an inverted order or processed simultaneously. At the same time, other operations can be added to these processes, or one step or several steps can be removed from these processes.

Internet of things means realizing modes of machine to machine (M2M), grand integration and cloud-based computing SaaS operation for ubiquitous terminal devices and facilities, including "internally intelligent" sensors, mobile terminals, industry systems, building automation systems, smart home facilities, video monitoring systems, etc., and "externally enabled" "intelligent objects or animals" or "intelligent mote", such as various asserts attached with a RFID, individuals and vehicles carrying wireless terminals, etc., through various wireless and/or wired long-distance and/or short-distance communication networks. In the environment of Intranet, Extranet, and/or Internet, an appropriate information safety insurance mechanism is adapted to provide secure, controllable, and personalized management and service functions such as real-time on-line monitoring, location tracking, action with alarm, dispatching and commanding, pre-arranged planning management, remote control, safety prevention, remote maintenance and protection, online update, statistical report, decision support, leader desktop (such as intensively presented Cockpit Dashboard), thereby realizing integrated management, control, and operation on "all things" effectively, energy-efficiently, securely and environment-friendly.

The management system of the intelligent Internet of things disclosed in the present application will be described by taking a factory as an example. However, application scenarios of the management system of the intelligent Internet of things according to the present disclosure are not limited thereto. For example, the management system of the intelligent Internet of things according to the present disclosure can be further applicable to scenarios of hospital, school, family, office building, gymnasium or other public services or private management.

FIG. 1 is a schematic diagram of a management system 100 of an intelligent Internet of things according to an embodiment of the present disclosure. The management system 100 of the intelligent Internet of things can comprise a sensing device 110, a network 120, a server 130, and a database 140 and a display device 150. In the following description, the management system 100 of the intelligent Internet of things can also be referred to as a system 100 for short.

The sensing device 110 comprises one or more sensing sub-devices 110a-110n. The sensing device 110 is configured to collect information from surrounding environment or other devices nearby. In some embodiments, the sensing sub-devices 110a-110n can be configured to receive data from the surrounding environment. For example, the sensing sub-devices can comprise sensors. For example, the sensing sub-devices 110a-110n can comprise sensors that detect state and position information of an user, such as infrared sensor, somatic sensor, brain wave sensor, speed sensor, acceleration sensor, positioning device (global positioning system (GPS) device, global navigation satellite system (GLONASS) device, compass navigation system device, Galileo positioning system (Galileo) device, quasi zenith satellite system (QZSS) system, base station positioning device, Wi-Fi positioning device Ultra Wideband UWB positioning device, etc.). For another example, the sensing sub-devices 110a-110n On may also be sensors or devices that detect the state of the surrounding environment, such as camera for collecting image/video data, microphone for collecting audio data, cleanliness sensor, pressure sensor, smoke detector, etc. For another example, the sensing sub-devices 110a-110n may also be a mechanical sensor, a resistive sensor, an inductive sensor, a piezoelectric sensor, an electromagnetic sensor, a semi-conductor sensitive element and so on, which can be used to detect a state of an operating device. In some examples, the sensing sub-devices may be formed by separate sensors independently, or may be integrated by a plurality of same or different sensor sets. In another embodiment, the sensing sub-devices 110a-110n can be configured to read data in a memory. For example, the sensing sub-devices 110a-110n may be a two-dimensional code/bar code reader, a RFID card reader, etc. In another embodiment, the sensing sub-devices 110a-110n can be intelligent terminals. For example, the sensing sub-devices 110a-110n may be smartphone, tablet computer, notebook computer, personal digital assistance (PDA), smart wearable devices (such as smart glasses, smart watches, smart bracelets, smart rings, intelligent helmet), and so on. In another embodiment, the sensing sub-devices 110a-110n may be an input device, for example, a cursor mouse, a keyboard, etc. The sensing sub-devices 110a-110n can be an independent hardware unit that realizes collection of the surrounding information. The one or more sensing sub-devices 110a-110b can be installed at different positions of the system 100 or can be wore or carried by the user.

By taking the factory as an example, different sensing sub-devices 110a-110n can be classified depending on their functions. For example, the sensing sub-device can be a positioning sensing device formed by a sensor used to detect state and location information of the user or a state sensing device used to monitor the environment state. For example, the positioning sensing device can comprise an electronic positioning tag. For another example, the state sensing device can comprise a camera used to capture the surrounding environment, an access control system used to monitor in and out of the personnel, a device state sensor used to monitor the operating state of the device and a power equipment and environmental system sensor (for example, temperature/humidity sensor) used to monitor the power equipment and environment variables within the factory.

The network 120 is used to receive and deliver information between respective parts of the system 100. The network 120 can be a separate network, or can be a combination of a plurality of different networks. For example, the network 120 is likely to be a local area network (LAN), a wide area network (WAN), a public network, a private network, a proprietary network, a public switched telephone network (PSTN), an Internet, a wireless network, a virtual network or any combination of the above networks. The network 129 can also comprise a plurality of network access points, for example, wired or wireless access points including a router/switch and a base station and so on. Through these access points, any data source can be accessed to the network 120 and transmit information via the network 120. For example, the network 129 can be an industrial Ethernet network, or a mobile communication network. The accessing mode of the network 120 may be wired or wireless. Wired access can be realized by means of optical fiber or electric cable. Wireless access can be realized by means of Bluetooth, wireless local area network (WLAN), Wi-Fi, WiMax, near field communication (NFC), ZigBee, mobile network (2G, 3G, 4G, 5G network, etc.), Narrow Band Internet of Things (NB-IOT) or other connection modes.

The server 130 is configured to, based on sensing data collected from the sensing sub-devices 110a-110n and a predetermined environment model, generate display data for updating state data in the environment model.

The server 130 may be a server hardware device, or a server group. Respective servers within one server group can be connected via a wired or wireless network. A server group may be centralized, for example, a data center. A server group may also be distributed, for example, a distributed system. The server 130 can be configured to collect information acquired by the sensing device 110, analyze and process the input information based on the data base 140, and generate the output content and convert it into image and sound/text signal to be delivered to the display device 150. A shown in FIG. 1, the database 140 may be independent, being directly connected to the network 110. The server 130 or other parts in the system 100 can directly access the database 140 via the network 120.

In one embodiment, the server 130 can comprise a central server and one or more backup servers, wherein the backup server has the same configurations as the central server. When the user terminals carried by the central server exceed a maximum load, it would voluntarily allocate subsequent user terminals to the backup server. The backup server has the same functions as the central server, and has consistency in the respectively carried user terminals.

In another embodiment, the server 130 can separate a data processing program from a Web server and other file servers. For example, the server 130 can comprise a static file server and a Web server, wherein the static file server is used to process static files (three-dimensional data, picture data, etc.), and the web server is used to process web page resources. Therefore, a server cluster can be utilized to respond to an obtaining request of the user terminals, thereby reducing the pressure of the central server greatly.

In another embodiment, the server 130 can comprise a server group composed by one or more servers in a symmetrical way. The server group comprises a central server and a backup server. Herein, each server has an equivalent status. Each server can process the data from the sensing device separately, without the help of other servers in the server group. Balanced load is realized by uniformly allocating the requests received by the server group to one server in the symmetrical structure, wherein the server to which a request has been allocated can process the request independently and make a response to the request. Herein, the balancing load algorithm can comprise Round Robin algorithm, weighted Round Robin algorithm, Traffic, User, Application, Session, Service, and Auto Mode, etc.

Client requests can be allocated to a server array by utilizing the balancing load algorithm, thereby providing a capability of quickly obtaining important data and solving a problem of large number of concurrent access services. Performance close to a mainframe host computer can be obtained at the lowest cost by utilizing clustering technique.

In another embodiment, the server 130 can be a cloud computing platform, and can be used to provide dynamic and easily expanded virtual resources. The cloud computing platform can provide available, convenient, and on-demand network access. The network access can have access to a configurable computing resource shared pools (the resources comprise network, server, storage, application software, service). For example, the server 130 can manage storage devices (such as hard disk drive HDD, solid state disk SSD, etc.) within the nodes through a virtual storage application (VSA) at each physical server node (for example, X86 server), and construct distributed storage of a cluster together with VSA in other nodes. The virtual server (Hypervisor) can be located between an application layer and an infrastructure layer, is capable of abstracting and pooling computing the network and stored resources, and has functions of controlling a plane. By configuring a plurality of server devices as having resources of computing, network, storage and server virtualization, and so on, quickly and flexibly cloud computing service can be provided. In some embodiments, the server 130 can be implemented by one or more processors.

The database 140 is used to store a variety of data files used for computer processing and/or communicating in the management system 100 of the intelligent Internet of things. For example, the database 140 can store environmental data collected by the sensing device 110, and intermediate data and/or finally obtained result produced in the process that the server 130 analyzes and processes the environmental, and output data generated according to the environmental data, and so on. The database 140 can use various storage devices. For example, the database 140 can comprise a hard disk, a solid storage device, an optical disk, etc. In some embodiments, the database 140 can further store other data which can be utilized by the server 130 upon processing data, for example, formula or rules that need to be used when the server 130 analyzes and processes the environmental data, criterion or threshold based on which determination is made.

The display device 150 can visually present images of the environmental data collected by the sensing device 110 to the user based on the content generated by the server. The images can comprise text, picture, video, etc. In one example, the images may be two-dimensional or three-dimensional. In one example, the display device 150 can further output a sound signal (such as alarm warning). In one embodiment, the display device 150 can be a display screen, and displays visualized images on the display screen. For example, the display device 150 may be an intelligent terminal (such as a computer, a notebook computer, a smart phone, etc.). Furthermore, the intelligent terminal can carry different operation systems (such as Windows, OS, Android, iOS. Windows Mobile, etc.). The user can use respective functions of the management system of the intelligent Internet of things in a web page format via a user interface such as a browser. In another embodiment, the display device 150 may be a virtual reality display device, a hologram display device, an augmented reality display device, etc. In another embodiment, the display device 150 may also be a projection device.

By utilizing the management system of the intelligent Internet of things provided in the present disclosure, it is capable of transmitting data from different sensing devices in the complicated Internet of things to a common server in order to be processed. This would assist the user in determining, planning, detecting, verifying, and diagnosing the situation/environment, and perform complete evaluation analysis and decision on importance of safety management and safety precaution. In addition, by modeling the environment of the Internet of things and the environmental data from different sensing devices, the user can intuitively monitor different types of objects at different positions in the environment of the Internet of things uniformly, which removes the trouble in obtaining different types of information in a traditional mode because of necessary use of different systems.

Figure 2A:
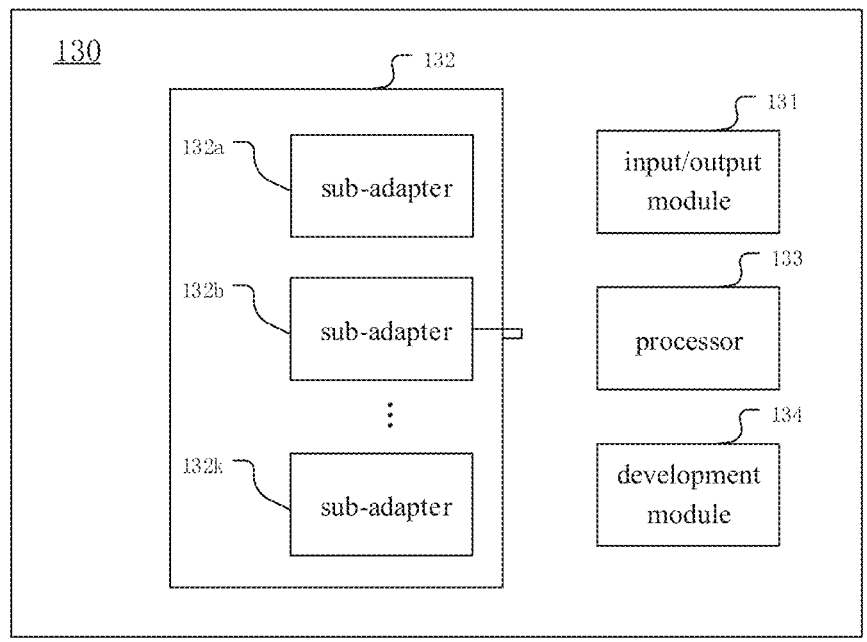
FIG. 2A shows a schematic diagram of a server according to some embodiments of the present disclosure.

FIG. 2A shows a schematic diagram of a server according to some embodiments of the present disclosure. The server in FIG. 2A can be implemented by any general computer device. The server 130 comprises an input/output module 131, an adapter 132, a processor 133 and a development module 134.

The input/output module 131 is configured to receive information and data from the network 120 and send data generated by the processor 133 and the development module 134 outwards via the network 120. Information received and transmitted by the input/output module 131 can be stored in any storage device which is integrated in the system described in the present disclosure or independent of the system 100. In one embodiment, the input/output module 131 sends the output data to different terminal devices by using HTML5 cross-platform technology. Those skilled in the art can implement the input/output module 131 as any circuit unit being capable of realizing data transmission.

The adapter 132 is configured to communicate data with the sensing device 110 and convert sensing data from one or more sensing sub-devices 110a-110n which is based on one or more different data communication protocols into a specific data type (such as json data). The adapter 132 can comprise one or more sub-adapters 132a-132k. Herein, each of the one or more sub-adapters 132a-132k is used for one of the one or more different data communication protocols.

The adapter 132 can communicate with an access control sub-system using UDP protocol by applying socket communication technology and communicate with a personnel positioning sub-system using TCP protocol by applying socket communication technology. Modes of data communication between the adapter 132 and the sensing device 110 will be described in detail by referring to FIG. 3.

The processor 133 is configured to analyze and process data from different sensing sub-devices. For example, the processor 133 can perform a big data analysis on the received data by means of big data acquisition, big data cleansing, big data standardization, and big data structuration. In another embodiment, the processor 133 can further form safe production supervision and processing solutions based on the received data by means of machine learning and deep learning.

The development module 134 is configured to model scenarios of the Internet of things and provide visualized presentation by utilizing data from respective sensing sub-devices. For example, application scenarios of the Internet of things and data collected by respective sensing devices can be presented to the user in a two-dimensional/three-dimensional mode.

The development module 134 can construct the application scenarios of the Internet of things based on a frequently-used three-dimensional model development platform and generate a corresponding environment model. For example, according to the factory scenario being taken as an example in the present disclosure, the user can utilize the development module 134 and perform three-dimensional modeling on fixed facilities workshop, devices and fences of the factory by combining with CAD engineering drawings and on-site measurements, and can store a constructed factory model in a storage for the purpose of repeat call after that. The development model 134 allows the user to edit the environment model.

In another embodiment, the development module can compress three-dimensional visualization model, texture map, and script logic definition within an integral data packet, and encrypt and protect three-dimensional simulation data of one or more models, so as to enhance safety of data.

In one embodiment, the processor 133 can generate display data used for updating state data in the environment model, based on data from each of the sub-adapters 132a-132k and a predetermined environment model generated by the development model 134.

In one embodiment, sensing data from each of the sensing sub-devices 110a-110n is associated with one sub-model in the environment model. For example, the data from the electronic positioning tag is associated with the coordinate system of the environment model. For another example, the sensing data from the state sensor is associated with a corresponding device model in the environment model, for example, associating image data from a camera A with a camera model located in the environment model corresponding to the camera A at the actual position, associating data from the temperature/humidity sensor with a space (such as machine room A) corresponding to the actual position of the temperature/humidity sensor in the environment model, and associating data from the device sensor with a model of a corresponding device in the environment model, etc.

Figure 2B:
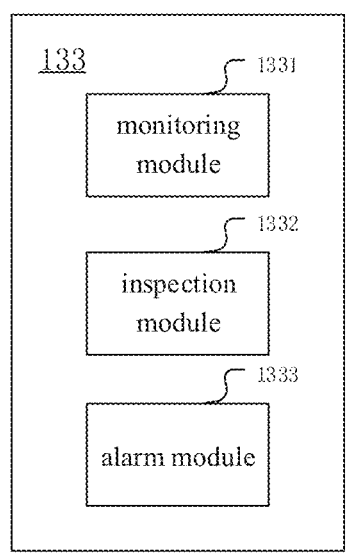
FIG. 2B shows a schematic diagram of a processor according to some embodiments of the present disclosure.

FIG. 2B shows a schematic diagram of a processor according to some embodiments of the present disclosure. The processor can comprise a monitoring module 1331, an inspection module 1332, and an alarm module 1333.

The monitoring module 1331 is configured to obtain real-time state data of a device. In the management system of the intelligent Internet of things according to the present disclosure, the device transmits data messages between the server sets by means of broadcasting. The real-time state data of the device can be obtained through the monitoring module.

The inspection module 1332 is configured to inspect the factory district. The inspection may be manual and/or automatic inspection. The manual inspection means presenting sensing data information obtained by respective sensing sub-devices at the user terminal in a free wandering way in response to an instruction sent by the user form the user terminal. That is, the user can adjust an observing view and an observing position of the environment model according to the requirement and obtain visualized display of information on the sensing data involving the current view. The automatic inspection means sequentially displaying information (for example, device state information) obtained by respective sensing sub-devices at the user terminal according to a predetermined routine. For the automatic inspection, the program can be performed in loops according to a period predetermined by the user.

The alarm module 1333 is configured to send an alarm prompt to the user. For example, the information (such as, temperature/humidity, cleanliness, equipment operating state, etc.) obtained by the sensing device is compared with a predetermine alarm interval according to the server. When the obtained data falls into the alarm interval (for example, exceeds a certain threshold value), the alarm module can send an alarm prompt to the user terminal. For example, the system can switch autonomously the model displayed on the user terminal to an optimal look-up view of the alarm device, and pop up autonomously a parameter state window of the current alarm device.

By utilizing the management system of the intelligent Internet of things provided in the present disclosure, it is capable of monitoring states of respective objects in the Internet of things in real time and making a real-time response and active control. Information collecting, sorting and studying is intensified by improving information flow channels, which provides comprehensive, timely and reliable messages for predicting future development of the environment of the Internet of things, and can analyze probability in deviation of the target in advance and take various preventive measures, so as to realize unified processing and management.

Figure 3:
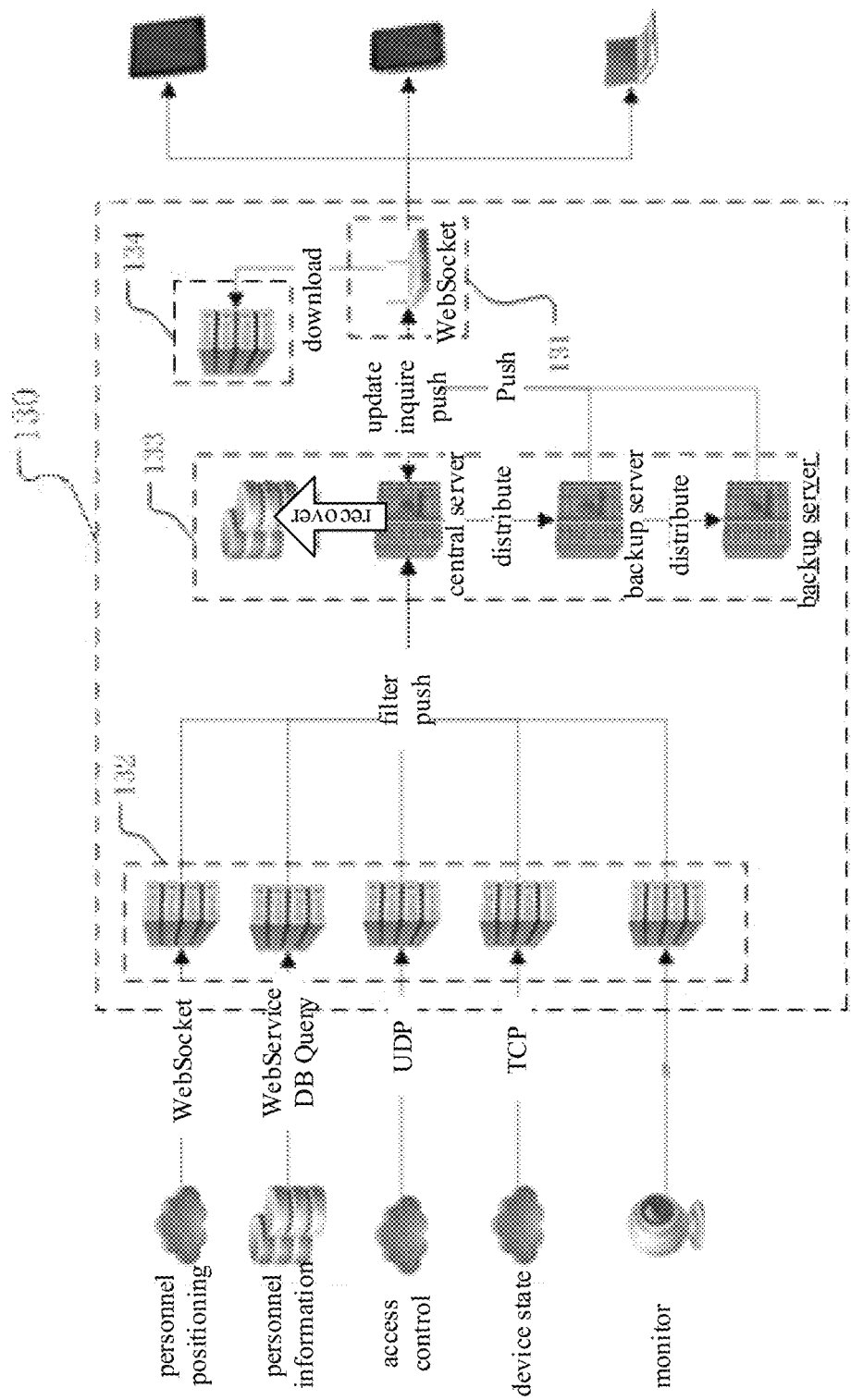
FIG. 3 shows a schematic diagram of an architecture of a server according to the present disclosure.

FIG. 3 shows a schematic diagram of an architecture of a server according to the present disclosure. As shown in FIG. 3, data from different sensing sub-devices is filtered by the adapters, and the data is pushed to a central server. The central server processes the data received from different application modules and pushes the processed data to different terminal devices based on a WebSocket protocol, wherein the processed data can be data in a Json format. Functions of decoupling, data separation, and being easy to be deployed of modules can be realized by processing data, analyzing data, responding to commands, and voluntarily feedbacking in the hierarchy way as shown in FIG. 3.

The server in the management system of the intelligent Internet of things disclosed in the present application adopts JAVA language as a development language. The server framework can comprise a SpringBoot framework used to connect Redis database and Socket. Redis database can be used for bottom communication and data crawling, and Socket can be used to for bi-directional long link at an upper layer. A middleware may be a timcat9 server. Herein, the SpringBoot framework has advantages of convenient development and maintenance and strong expansion capability; Redis database can perform storing and inquiring based on big data, and has the advantage of faster data obtaining, and has the function of recovering from power failure; Socket technology is based on bottom communication technology, and its data transmission efficiency is more efficient than HTTP request.

For example, upon data communication with the access control sub-system, operation steps of the corresponding sub-adapters can comprise:

performing data connection using socket communication technique by adopting the UDP protocol, parsing byte stream data, and processing it into json data;

creating a webapi interface, and returning the access control json data.

For another example, upon data communication with the positioning sub-system, operation steps of the corresponding sub-adapters can comprise:

performing data connection using socket communication technique by adopting the TCP protocol, and receiving the transmitted byte stream information;

processing parsed byte streams, converting it into a json object, creating webapi, and returning to the json object.

When the positioning sub-system is used for personal positioning, the server obtains personnel information by directly connecting to the personnel information database (sqlserver), and the operation steps can comprise:

using ADO EF technique to connect and read the personnel information database (sqlserver), and obtain database table information;

processing types of personnel information, opening different interfaces webapi, and transmitting the json data to the user terminal.

For another example, upon data communication with the power device and the environment sub-system, operation steps of the corresponding sub-adapters can comprise:

using socket communication technique to connect and read information, and parsing the byte stream data;

processing the byte stream data into json object, opening a corresponding webapi interface, and returning to the json data.

For another example, upon data communication with the device state sub-system, operation steps of the corresponding sub-adapters can comprise:

exporting database files as files in json format, and reading file obtaining information.

When the device state sub-system sends an alert to the server, operation steps of the corresponding sub-adapters can comprise:

performing data connection using socket communication technique by adopting the TCP protocol, and receiving the transmitted byte stream information;

processing the parsed byte stream, converting it into json object, creating webapi, and returning the json object.

By utilizing the management system of the intelligent Internet of things provided in the present disclosure, it is capable of incorporating, correlating and combining data of a plurality of sensor information sources, and can obtain more accurate information estimation, so as to realize the process of real-time and full evaluation of the environment of the Internet of things.

FIG. 4 shows a method for the management system of the intelligent Internet of things. As shown in FIG. 4, a process 400 comprises:

Step 410: receiving, from one or more first sensing device, first sensing data that conforms to a first type of data transmission protocol, and converting the first sensing data that conforms to the first type of data transmission protocol into first sensing data that conforms to a third type of data transmission protocol, wherein the first sensing data is associated with a first sub-model in a predetermined environment model.

Step 420: receiving, from one or more second sensing devices, second sensing data that conforms to a second type of data transmission protocol, and converting the second sensing data that conforms to the second type of data transmission protocol into second sensing data that conforms to a third type of data transmission protocol, wherein the second sensing data is associated with a second sub-model in the predetermined environment model, and wherein the second type of data transmission protocol and the first type of data transmission protocol are different.

Step 430: generating display data of a predetermined environment model including an updated first sub-module and/or an updated second sub-module, based on the first sensing data that conforms to the third type of data transmission protocol, the second sensing data that conforms to the third type of data transmission protocol and the predetermined environment model, wherein the first sub-model is updated by the first sensing data, and the second sub-module is updated by the second sensing data.

Optionally, the process 400 further comprises a step 440: transmitting the display data to a corresponding user terminal in response to a request from the user.

At least following visualization effects can be realized according to the management system of the intelligent Internet of things of the present disclosure.

three-dimensional virtual visualization function of the factory district, such as angle of view control, navigation map display, information display, etc.;

personnel positioning and tracking function, such as personnel position real-time display, area coverage alarm promt, etc.;

real-time monitoring embedding function, such as monitoring area display, monitoring picture-in-picture display, etc.;

FMC device state presentation function, such as device real-time display, device failure alarm promt, etc.;

access control state presentation function, such as real-time access control state display, monitored screen switch associated with the access control system, etc.;

tension force fence data visualization function, such as tension force fence layout display, tension force fence alarm promt, etc.;

function of visualizing temperature, humidity, cleanliness of respective factory districts, such as temperature/humidity data display of the machine room, temperature/humidity alarm of the machine room, etc.

In one embodiment, the first sensing device can be a positioning device such as an electronic positioning tag. The electronic positioning tag is associated with the coordinate system in the predetermined environment model, and the generating display data of the predetermined environment model including an updated first sub-module and/or an updated second sub-module comprises:

Generating, according to coordinate data received from the electronic positioning tag, display data that includes the predetermined environment model and is used to display a marker that indicates the electronic positioning tag on corresponding coordinates in the predetermined environment model.

In particular, the data from the electronic positioning tag is associated with the coordinate system of the environment model. The display data that includes the predetermined environment model and is used to display a marker for displaying a marker that indicates the electronic positioning tag on corresponding coordinates in the predetermined environment model is generated according to the coordinate data received from the electronic positioning tag.

In another embodiment, the second sensing device can be a state sensor used to monitor an environment state. The state sensor is associated with device models disposed in the predetermined environment model, and the generating display data of the predetermined environment model including an updated first sub-module and/or an updated second sub-module comprises:

Generating, according to the environment state data received from the state sensor, display data that includes the predetermined environment model and is used to display the environment state data as state data of an associated device model in the predetermined environment model.

In particular, the sensing data from the state sensor is associated with the corresponding device model in the environment model. For example, image data from a camera A is associated with a camera model located at the actual position corresponding to the camera A in the environment model, data from the temperature/humidity sensor is associated with a space (such as a machine room A) corresponding to the actual position of the temperature/humidity sensor in the environment model, and data from the device sensor is associated with a model of a corresponding device in the environment model, etc. The display data for displaying the environment state data as the state data of the associated device model in the predetermined environment model is generated according to the environment state data received from the state sensor. For example, the image data captured by the camera A is displayed as the image data displayed by the corresponding camera model. The user can take out images captured by the camera A on the user interface by selecting its corresponding camera model. Similarly, the user can look up the device state information and the temperature/humidity information on the user interface.

By utilizing the method for management of the intelligent Internet of things provided in the present disclosure, it is capable of transmitting data from different sensing devices in the complicated Internet of things to a common server to be processed. This would assist the user in determining, planning, detecting, verifying, and diagnosing the situation/environment, so that complete evaluation analysis and decision on safety management and its importance is performed. In addition, by modeling the environment of the Internet of things and the environment data from different sensing devices, the user can intuitively monitor different types of objects in the environment of Internet of things uniformly, which removes the trouble in obtaining different types of information in a traditional mode because of necessary use of different systems.

Figure 5:
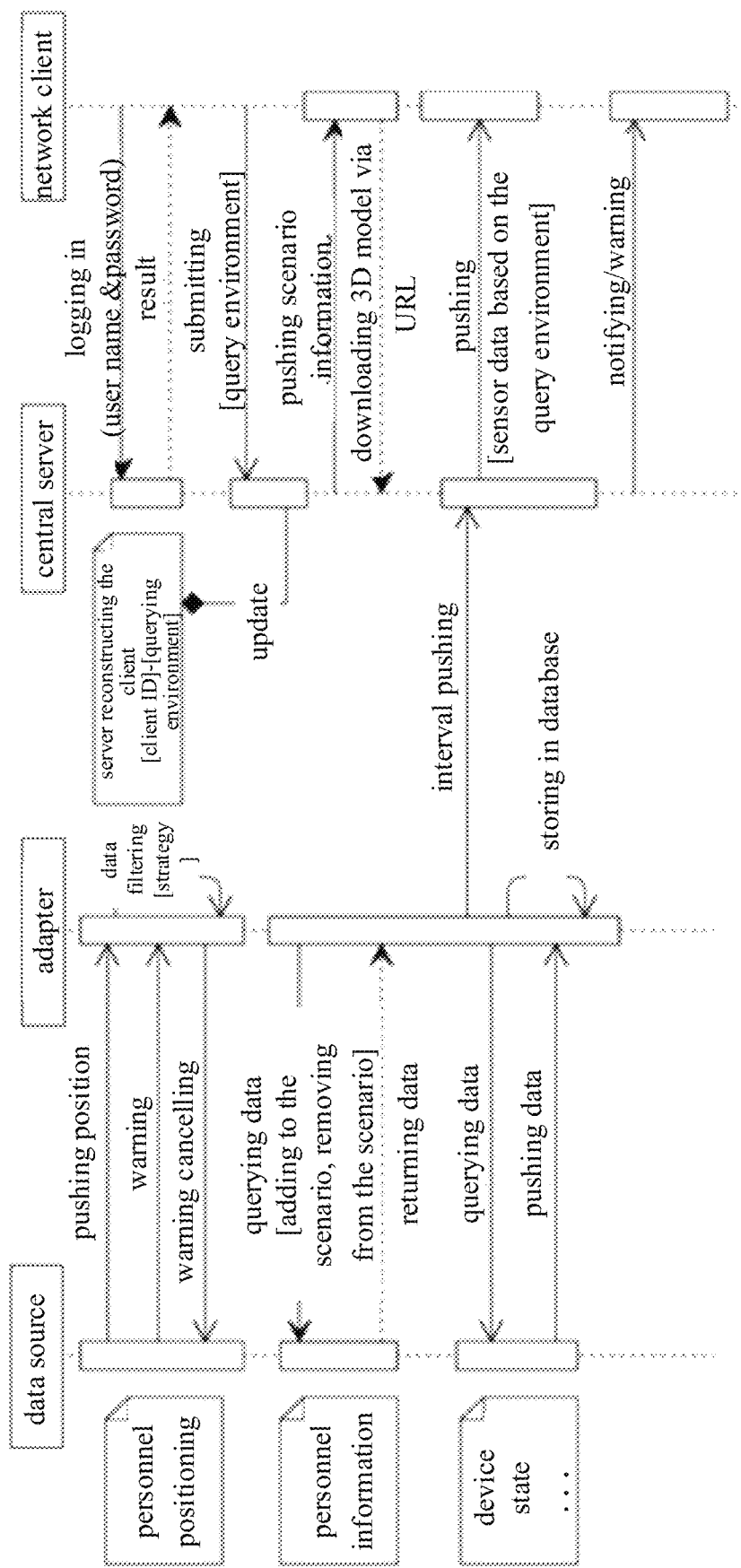
FIG. 5 shows a process of data processing and transmission based on an architecture of a server of the present disclosure.

FIG. 5 shows a process of data processing and transmission based on an architecture of the server of the present disclosure.

In one embodiment, the system receives positioning data collected from the positioning sensor. As described above, the positioning data can be data based on the TCP protocol. The positioning sensor pushes the positioning data to a corresponding adapter. In some embodiments, if quantity of electricity of the positioning sensor is lower than a certain threshold value, the positioning sensor would deliver a warning to indicate insufficient electricity. The adapter can send data information for canceling the warning to the positioning sensor. The adapter filters the positioning data based in a predetermined strategy.

In another embodiment, the system sends a request for the personnel information from the adapter. The sensing sub-devices returns the corresponding personnel information in response to the request sent from the adapter.

In some embodiments, the system sends the request for the device state information from the adapter. The device pushes the device state to the adapter in response to the request sent from the adapter. In one example, the adapter would store the received device state in a storage.

The adapter converts the data that is from different sensing devices and conforms to different data transmission protocols into data that conforms to a specific data transmission protocol and pushed converted data to the central server. In one embodiment, the adapter can push the converted data to the central server at a predetermined interval.

FIG. 5 further shows a process of data transmission between the central server and the user terminal. For example, the user can send a request for logging in to the central server through the user terminal, and the request for logging in can comprise user information (such as user name, password, etc.). The central server returns the log-in result to the user terminal in response to the request for logging in sent by the user.

For another example, the user can send a request for environment (Query Condition) to the central server through the user terminal. The central server can push scenario information to the user terminal in response to the request for environment sent by the user. In one embodiment, the central server can download a three-dimensional model from the user terminal via URL.

For another example, the central server can push various information obtained by the sensing device to the user terminal in response to the request for environment sent by the user.

For another example, when the data obtained by the sensing sub-devices satisfies a predetermined condition, the central server can deliver a notification/warning to the user terminal.

Figure 6A:
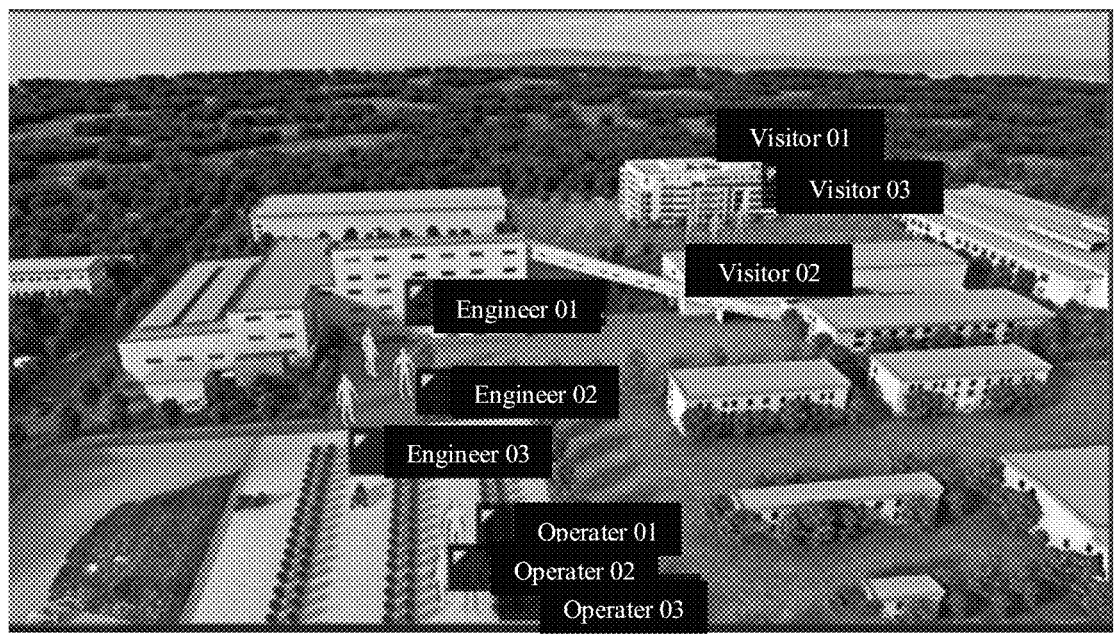
FIG. 6A shows a schematic diagram of a virtualized presentation of scenarios of the Internet of things according to one embodiment of the present disclosure.

FIG. 6A shows a schematic diagram of visual presentation of scenarios of the Internet of things according to one embodiment of the present disclosure. As shown in FIG. 6A, the personnel in the environment of the Internet of things (taking the factory as an example) comprises engineers 01-03, operators 01-03, and visitors 01-03. Each one of the personnel carries a positioning sensor which identifies personal information. As described above, according to the positioning data received by the server from the positioning sensors carried by the engineers 01-03, the operators 01-03, and the visitors 01-03, the positioning data from the positioning sensors is associated with the coordinate of the factory model. According to the positioning data (such as coordinate data) collected by the positioning sensors, the server generates display data for updating coordinates in the factory model based on a preset factory model. For example, the server generates a marker (for example, a human shape marker in FIG. 6A) for indicating the position of an engineer 01 in the factory model by utilizing the coordinate data collected by the positioning sensor carried by the engineer 01. The display device can display the generated marker of the engineer 01 in the factory model.

Figure 6B:
FIG. 6B shows a schematic diagram of a virtualized presentation of scenarios of the Internet of things according to one embodiment of the present disclosure.

FIG. 6B shows a schematic diagram of visual presentation of scenarios of the Internet of things according to one embodiment of the present disclosure. As shown in FIG. 6B, personnel markers in the environment of the Internet of things (taking the factory as an example) comprise personnel name, personnel number, and department information. Each of the personnel carries a positioning sensor that identifies personal information. As described above, the server generates a marker for indicating the position of the personnel in the factor model based on the positioning data collected by the positioning sensor carried by the personnel and displays the personnel information of the personnel. According to the user interface as shown in FIG. 6B, there is further provided a marker so that the user can select a specific type of sensing device information (such as temperature/humidity, monitoring system, personnel information, access control system, FMC system) which the user desires to look up. The server sends display data corresponding to the request of the user to the display device based on the request of the user.

According to the three-dimensionally presented factory model based on the positioning sensors, the user can intuitively observe the position of the personnel in the factory district and track the position of respective personnel.

Figure 7:
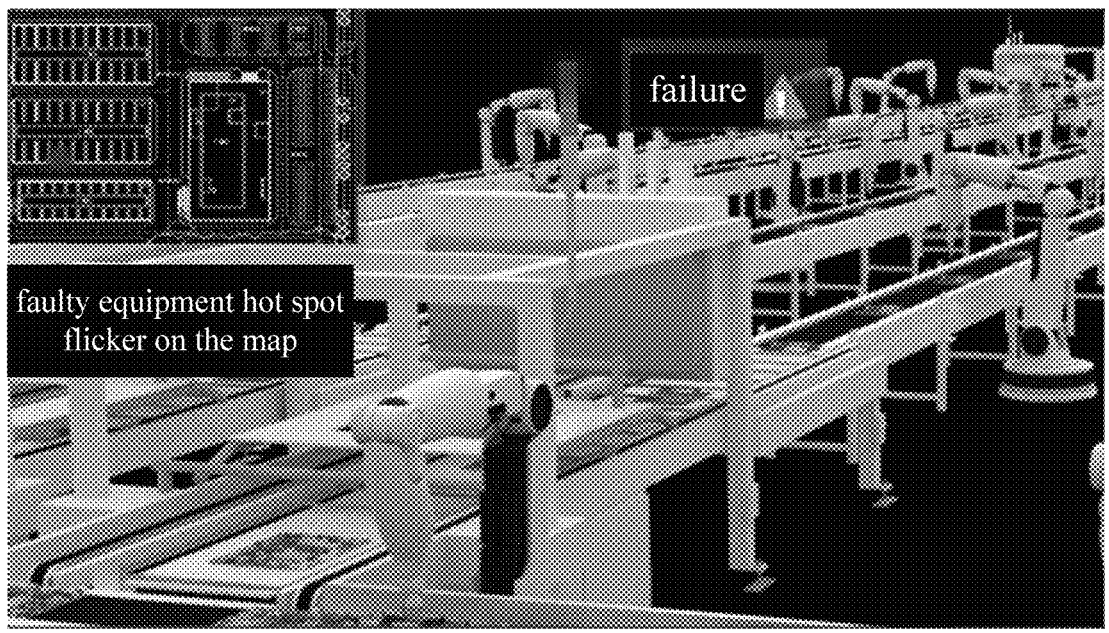
FIG. 7 shows a schematic diagram of a virtualized presentation of scenarios of the Internet of things according to one embodiment of the present disclosure.

FIG. 7 shows a schematic diagram of visual presentation of scenarios of the Internet of things according to one embodiment of the present disclosure. Herein, data collected by the device state sensor on the actual device is associated with the model of the device corresponding to the factory model. Based on the data collected by the device state sensor, the system can display the actual device state parameter (not shown) at a model of the corresponding device of the user terminal. As shown in FIG. 7, when failure occurs to the device, the system can send a promt to the user terminal, and display a position (for example, faulty equipment hot spot flicker on the map as shown in FIG. 7) where a specific failure occurs in the three-dimensional model displayed on the user terminal. In one example, the system can switch automatically to the optimal look-up view of the alarm device and automatically pop up the parameter state window of the current alarm device.

Figure 8:
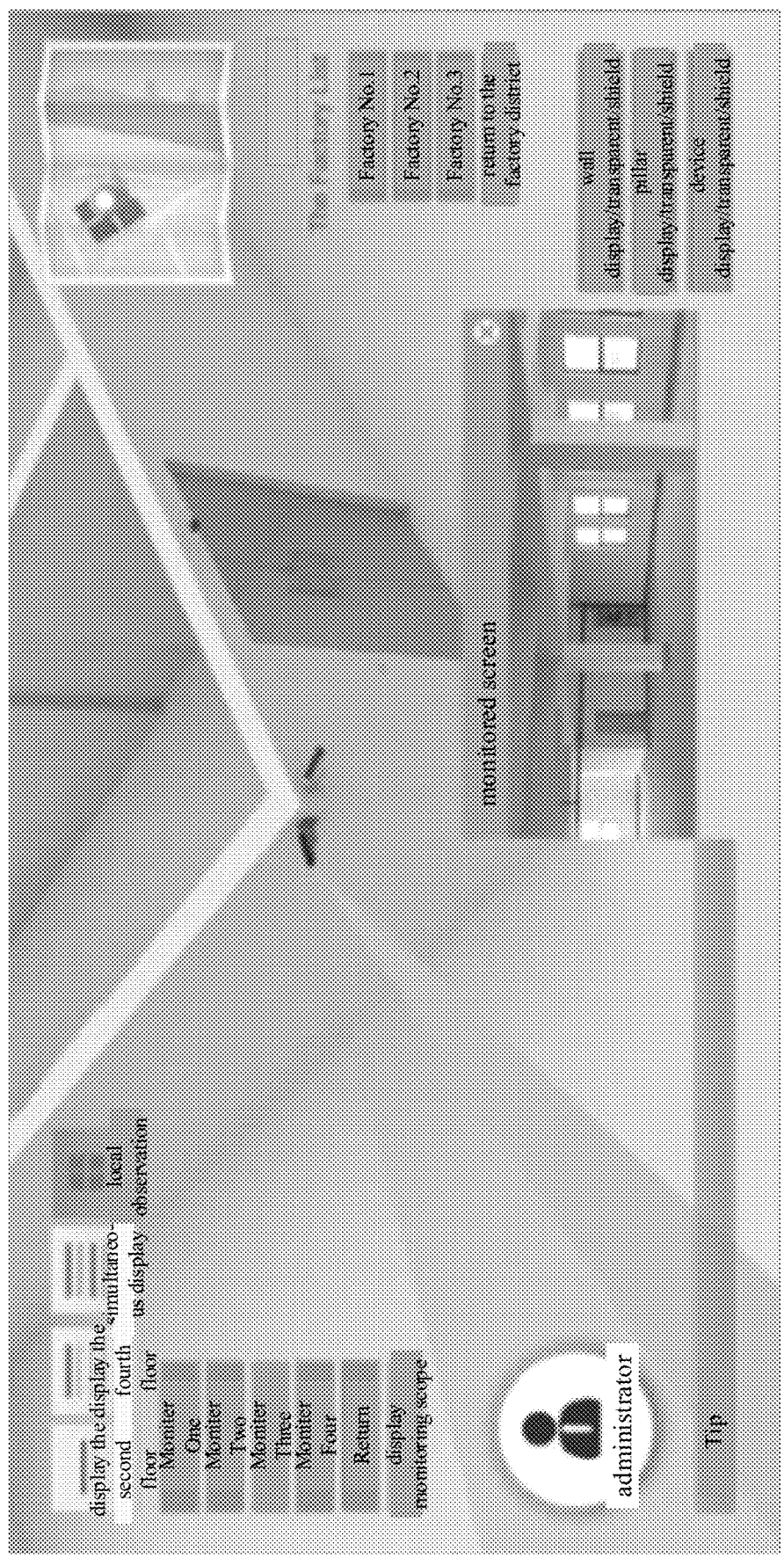
FIG. 8 shows a schematic diagram of a virtualized presentation of scenarios of the Internet of things according to one embodiment of the present disclosure.

FIG. 8 shows a schematic diagram of visual presentation of scenarios of the Internet of things according to one embodiment of the present disclosure. The user utilizes the factory model at the user terminal to observe the monitoring information within the factory district. The factory model comprises a model of each monitoring device in the monitoring sub-system. The user can intuitively see in the factory model which places are equipped with the monitoring device. In addition, image data captured by each actual monitoring device is associated with a monitor model in the factory model corresponding to the actual position of the monitoring device. The user can take out a monitored screen captured by the corresponding actual monitoring device by selecting the monitor model in the factory model. As shown in FIG. 8, the user can switch the look-up view of the factory model by selecting a marker (such as "No. 1 factory", "No. 2 factory"), so as to select monitoring devices located at different positions. In addition, the user can further select a picture of a monitoring device which the user desires to view from a plurality of monitoring devices existing in a same view by selecting a marker (such as "first monitor", "second monitor"). In one example, the monitored screen can be displayed in a three-dimensional model scenario in a picture-in-picture manner. In another example, the user can control the monitoring device to change its photographing angle by sending instructions to the monitoring device through a client.

Figure 9:
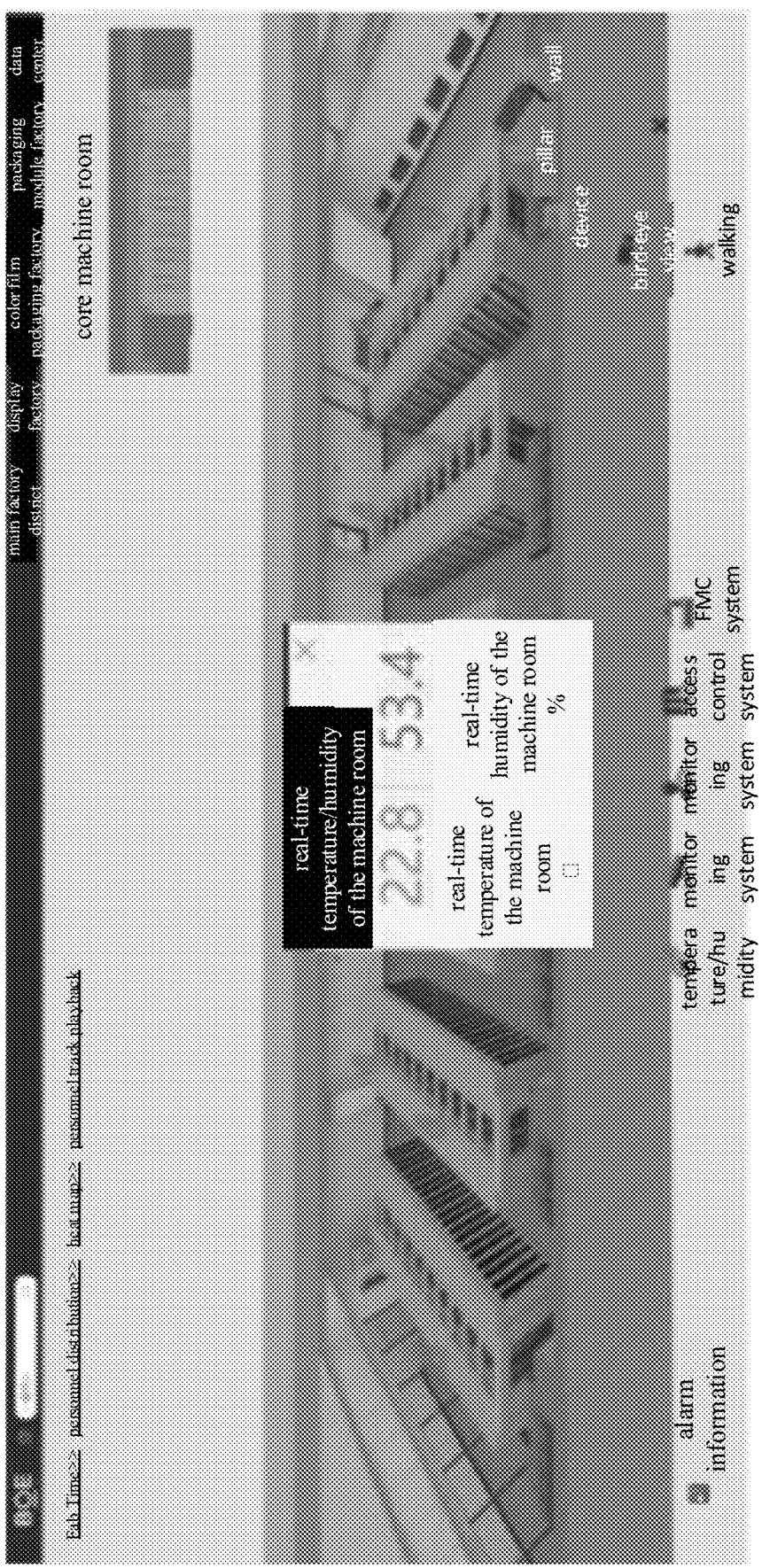
FIG. 9 shows a schematic diagram of a virtualized presentation of scenarios of the Internet of things according to one embodiment of the present disclosure.

FIG. 9 shows a schematic diagram of visual presentation of scenarios of the Internet of things according to one embodiment of the present disclosure. The user can observe environmental monitoring information of a certain area (such as machine room) within the factory district in the factory model at the user terminal. As shown in FIG. 9, there are a plurality of thermometer/hygrometer models in the factory model. These thermometer/hygrometer models are associated with the data collected by the temperature/humidity sensors existing in corresponding positions in the actual machine room. By selecting one of the plurality of thermometer/hygrometer models, the user can look up the current data of the actual temperature/humidity sensor associated therewith. In one example, based on the request of the user, monitoring a temperature/humidity screen can be displayed in a three-dimensional model scenario in a highlighted way.

The above describes different aspects of the method for providing the information required by the system of the intelligent Internet of things and/or the method for implementing other steps through a program. The program part in the technique can be deemed as "product" or "manufactured goods" existing in a form of executable codes and/or related data, and is participated or realized by a computer readable medium. A tangible or permanent storage medium can comprise a memory or storage used by any computer, processor, or similar devices or related modules, for example, various semi-conductor storages, tape drives, disk drives or any similar device being capable of providing storing function for a software.

The software or a part thereof is sometimes possible to communicate via network, such as Internet or other communication networks. This type of communication can load the software form one computer device or processer, for example, loading one server or host computer of the Internet of things to a hardware platform of a computer environment, or other computer environments that realizes the system, or a system of a similar function relating to providing the information required by the Internet of things. Therefore, another medium being capable of delivering a software element can also be used as physical connection between the local devices, for example, optical wave, electric wave, electromagnetic, etc. Broadcasting is realized via an electric cable, an optical cable or air and so on. A tangible medium used for carrying waves, such as electric cable, wireless connection or optical cable or other similar devices can also be considered as a medium carrying the software. Herein, unless it is limited as a tangible "storage" medium, other terms denoting a computer or machine "readable medium" represent a medium involved in the process that the processer executes any instruction.

One computer readable medium is likely to have various forms, including tangible storage medium, carrier medium or physical transmission medium, etc. A stable storage medium can comprise: an optical disk or a magnetic disk, and other storage systems which are used in computer or similar devices and are capable of realizing the system components described in the figure. Unstable storage medium can comprise dynamic memory, for example, primary memory of the computer platform. The tangible transmission medium can comprise coaxial cable, copper cable and optical fiber, for example, a route forming a bus line within the system of the computer. The carrier transmission medium can deliver electric signals, electromagnetic signals, acoustic wave signals, or optical wave signals, etc. These signals can be produced by the method of radio frequency or infrared data communication. The general computer readable medium comprises hardware, software, magnetic tape, or any other magnetic media; CD-ROM, DVD, DVD-ROM, or any other optical media; a punched card, or any other physical storage medium including pinhole modes; RAM, PROM, EPROM, FLASH-EPROM, or any other storage chips or magnetic tapes; transmission data or carriers, electric cable of instructions or connection means of transmission carriers, or any other program codes and/or data that can be read by utilizing the computer. There would be many kinds these forms of computer readable medium appearing in the process that the processor executes instructions and delivers one or more results.

"Module" in the present application refers to logic or a set of software instructions stored in a hardware or a firmware. The "module" referred herein is capable of being executed by a software and/or hardware module, or being stored in any kind of computer readable non-temporary media or other storage devices. In some embodiments, one software module can be compiled and connected to an expectable process. Obviously, the software module herein can make a response to its own information or information delivered by other modules, and/or can make a response when certain events or disconnections are detected. A software module can be provided on one computer readable medium, and this software module can be configured to execute operations on a computing device (for example, processor). The computer readable medium herein can be an optical disk, an optical digital disk, a magnetic disk or any other kinds of tangible medium. Also, the software module can be obtained in a mode of digital download (the digital download can also comprise data stored in a zip or rar or package, and needs to be decompressed or decoded before being executed). Codes of the software module herein can be partially or completely stored in the storage device of the computing device executing operations, and are applied in the operations of the computing device. The software instructions can be inserted into a firmware, for example, an erasable programmable read-only memory (EPROM). Obviously, the hardware module can comprise logic units connected together, for example, a gate or a trigger, and/or comprise a programmable unit, for example, a programmable gate array or processor. Functions of the module or computing device described herein are preferable implemented as a software module, but can also be denoted in a hardware or a firmware. Generally, the module referred herein is a logic module, without being limited by its specific physical form or storage. One module can be combined together with other modules, or separated into a series of sub-modules.

Unless otherwise defines, all the termism (including technical and scientific terms) used herein have same meaning commonly understood by those ordinary skilled in the art. It shall be understood that those terms defined in common dictionaries shall be explained as having meanings consistent with their meaning in the context of relative technology, but shall not be explained as idealized or very formal meanings, unclear explicitly defined herein.

The above are descriptions of the present disclosure, but shall not be deemed as limitations to the present disclosure. Although several exemplary embodiments of the present disclosure are described, it is easy for those skilled in the art to understand that many modifications and amendments can be made to exemplary embodiments without departing novel teachings and advantages of the present disclosure. Therefore, all these amendments intend to be included within the scope of the present disclosure defined in the Claims. It shall be understood that the above are descriptions of the present disclosure but shall not be deemed as being limited to specific embodiments of the present disclosure. Furthermore, amendments made to the disclosed embodiments and other embodiments intend to be included within the scope of the attached Claims. The present disclosure is defined by the Claims and equivalents thereof.

What is claimed is:

1. A method for management of an Internet of things, comprising:
   receiving, from one or more first sensing devices, first sensing data that conforms to a first type of data transmission protocol, and converting said first sensing data that confirms to said first type of data transmission protocol into first sensing data that confirms to a third type of data transmission protocol, wherein said first sensing data is associated with a first sub-model in a predetermined environment model;
   receiving, from one or more second sensing devices, second sensing data that conforms to a second type of data transmission protocol, and converting said second sensing data that conforms to said second type of data transmission protocol into second sensing data that conforms to the third type of data transmission protocol, wherein said second sensing data is associated with a second sub-model in said predetermined environment model, wherein said second type of data transmission protocol is different from said first type of data transmission protocol; and
   generating display data of said predetermined environment model including an updated first sub-model and/or an updated second sub-model, based on the first sensing data that conforms to the third type of data transmission protocol, the second sensing data that conforms to the third type of data transmission protocol and said predetermined environment model, wherein said first sub-model is updated by said first sensing data, and said second sub-model is updated by said second sensing data,
   wherein said first sensing device is a positioning sensor including an electronic positioning tag, said electronic positioning tag is associated with a coordinate system in said predetermined environment model, and said generating display data of said predetermined environment model including the updated first sub-model and/or the updated second sub-model comprises:
   generating, according to coordinate data received from said electronic positioning tag, display data that includes said predetermined environment model and is used to display a marker indicating said electronic positioning tag on a corresponding coordinate in said predetermined environment model,
   wherein, each marker of a plurality of markers in the display data corresponds to one personnel carrying a positioning sensor which identifies personal information, and the marker indicates a position in said predetermined environment model of the personnel based on coordinate data from the positioning sensor,
   wherein, the method further comprises:
   obtaining a first determination result according to the first sensing data or the second sensing data; and
   sending an alarm signal based on the first determination result, and wherein, said generating display data of said predetermined environment model including the updated first sub-model and/or the updated second sub-model further comprises:
switching angle of view to display a parameter state of a device model associated with said first sensing device when the alarm signal is sent out based on the first sensing data;
switching angle of view to display a parameter state of a device model associated with said second sensing device when the alarm signal is sent based on the second sensing data.

2. The method according to claim 1, further comprising:
transmitting said display data to a user terminal in response to a request from a corresponding user terminal.

3. The method according to claim 1, wherein said second sensing device is a state sensor used to monitor an environment state, said state sensor is associated with a device model disposed in said predetermined environment model, and said generating display data of said predetermined environment model including the updated first sub-model and/or the updated second sub-model further comprises:
generating, according to environment state data received from said state sensor, display data that includes said predetermined environment model and is used to display said environment state data as state date of an associated device model in said predetermined environment model.

4. The method according to claim 3, wherein said state sensor comprises a temperature sensor, a humidity sensor, a camera, a device state sensor.

5. The method according to claim 1, further comprising:
allocating the first sensing data and the second sensing data to a distributed sub-processor in a symmetric way.

6. The method according to claim 5, further comprising:
transmitting the first sensing data and the second sensing data to said distributed processor in a broadcasted way; and
monitoring the first sensing data and the second sensing data.

7. The method according to claim 1, further comprising:
in said predetermined environment model, circularly switching angle of view based on a predetermined sequence to generate sequentially display data for updating state data of each of a plurality of device models.

8. A server for a system of an Internet of things, comprising:
an adapter, including at least a first sub-adapter and a second sub-adapter, wherein
said first sub-adapter is configured to receive, from one or more first sensing devices, first sensing data that conforms to a first type of data transmission protocol, and convert the first sensing data that conforms to the first type of data transmission protocol into first sensing data that conforms to a third type of data transmission protocol, wherein said first sensing data is associated with a first sub-model in a predetermined environment model;
said second sub-adapter is configured to receive, from one or more second sensing devices, second sensing data that conforms to a second type of data transmission protocol, and convert the second sensing data that conforms to the second type of data transmission protocol into second sensing data that conforms to the third type of data transmission protocol, wherein said second sensing data is associated with a second sub-model in said predetermined environment model, wherein said first type of data transmission protocol is different from said second type of data transmission protocol;
a processor, configured to generate display data of said predetermined environment model including an updated first sub-model and/or an updated second sub-model, based on the first sensing data that conforms to the third type of data transmission protocol, the second sensing data that conforms to the third type of data transmission protocol and said predetermined environment model,
wherein said first sensing device is a positioning sensor including an electronic positioning tag, wherein said electronic positioning tag is associated with a coordinate system in said predetermined environment model, and when said processor generates the display data of said predetermined environment model including the updated first sub-model and/or the updated second sub-model, said processor is configured to:
generate, according to coordinate data received from said electronic positioning tag, display data that includes said predetermined environment model and is used to display a marker indicating said electronic positioning tag on a corresponding coordinate in said predetermined environment model,
wherein, each marker of a plurality of markers in the display data corresponds to one personnel carrying a positioning sensor which identifies personal information, and the marker indicates the position of the personnel based on coordinate data from the positioning sensor,
wherein said processor is further configured to:
obtain a first determination result according to the first sensing data or the second sensing data, and send an alarm signal based on the first determination result;
switch angle of view to display a parameter state of a device model associated with said first sensing device when the alarm signal is sent out based on the first sensing data;
switch angle of view to display a parameter state of a device model associated with said second sending device when the alarm signal is sent based on the second sensing data.

9. The server according to claim 8, further comprising:
an output module, configured to transmit said display data to a user terminal in response to a request from a corresponding user terminal.

10. The server according to claim 8, wherein said second sensing device is a state sensor used to monitor an environment state, said state sensor is associated with a device model disposed in said predetermined environment model, and when said processor generates the display data of said predetermined environment model including the updated first sub-model and/or the updated second sub-model, said processor is further configured to:
generating, according to environment state data received from said state sensor, display data that includes said predetermined environment model and is used to display said environment state data as state date of an associated device model in said predetermined environment model.

11. The server according to claim 8, wherein said processor is further configured to:
allocate the first sensing data and the second sensing data to a distributed sub-processor in a symmetric way.

12. The server according to claim 11, wherein said processor is further configured to:
- obtain the first sensing data and the second sensing data transmitted to said distributed processor in a broadcasted way.

13. The server according to claim 8, wherein said processor is further configured to:
- in said predetermined environment model, circularly switch angle of view based on a predetermined sequence to generate sequentially display data for updating state data of each of a plurality of device models.

14. A system of an Internet of things, comprising:
- a sensing device, including at least a first sensing device and a second sensing device, wherein said first sensing device is configured to collect first sensing data that conforms to a first type of data transmission protocol, and said second sensing device is configured to collect second sensing data that conforms to a second type of data transmission protocol;
- a server, configured to execute steps of said method according to claim 1;
- a display terminal, configured to receive display data from said server, and display an update environment model according to received display data.

* * * * *